(12) United States Patent
Luo et al.

(10) Patent No.: US 9,130,382 B1
(45) Date of Patent: Sep. 8, 2015

(54) CHARGING PROTECTION CIRCUIT

(75) Inventors: Yibao Luo, Shenzhen (CN); Shuai Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/389,615

(22) PCT Filed: May 14, 2012

(86) PCT No.: PCT/CN2012/075469
§ 371 (c)(1),
(2), (4) Date: Mar. 31, 2015

(87) PCT Pub. No.: WO2013/143207
PCT Pub. Date: Oct. 3, 2013

(30) Foreign Application Priority Data

Mar. 31, 2012 (CN) .................. 2012 2 0146863 U

(51) Int. Cl.
*H02J 7/00* (2006.01)
*H02J 7/02* (2006.01)
*H04B 5/00* (2006.01)

(52) U.S. Cl.
CPC ............ *H02J 7/0029* (2013.01); *H02J 7/0047* (2013.01); *H02J 7/025* (2013.01); *H04B 5/0037* (2013.01); *H04B 5/0087* (2013.01)

(58) Field of Classification Search
CPC ............ H02J 7/025; H02J 7/027; H02J 17/00
USPC .................. 320/107, 108, 115, 162
See application file for complete search history.

(56) References Cited

U.S. PATENT DOCUMENTS

| | | | |
|---|---|---|---|
| 8,629,654 B2 * | 1/2014 | Partovi et al. ............... | 320/108 |
| 2010/0156343 A1 * | 6/2010 | Jung ........................... | 320/108 |
| 2011/0057606 A1 | 3/2011 | Ilmari | |

FOREIGN PATENT DOCUMENTS

| | | |
|---|---|---|
| CN | 101841173 A | 9/2010 |
| CN | 102097668 A | 6/2011 |
| CN | 102179003 A | 9/2011 |
| WO | WO 2008133388 A1 | 11/2008 |

OTHER PUBLICATIONS

International Search Report for Application No. PCT/CN 2012/075469 dated Dec. 12, 2012.
International Preliminary Report on Patentability for Application No. PCT/CN 2012/075469 dated Oct. 1, 2014.
Written Opinion of the International Searching Authority for Application No. PCT/CN2012/075469 dated Jan. 2, 2013.

* cited by examiner

*Primary Examiner* — Edward Tso
*Assistant Examiner* — Aaron Piggush
(74) *Attorney, Agent, or Firm* — Jenkins, Wilson, Taylor & Hunt, P.A.

(57) ABSTRACT

Provided is a charging protection circuit. The charging protection circuit includes a wireless charging base and a charging receiving circuit. The charging receiving circuit includes first receiving coils configured to receive electromagnetic waves from the wireless charging base; a high-permeability magnetic core coupled to the first receiving coils and configured to block electromagnetic waves opposite to the electromagnetic waves from the wireless charging base; a detection circuit coupled to the high-permeability magnetic core and configured to detect whether the high-permeability magnetic core has failed; and a power supply circuit coupled to the high-permeability magnetic core and configured to convert electromagnetic energy generated by electromagnetic waves into electric energy to supply power to a power receiving device. With the technical solution, the serious result caused by continuous charging of a wireless charger after a high-permeability magnetic core has failed is avoided, thus guaranteeing the security of a power receiving device.

20 Claims, 3 Drawing Sheets

CHARGING PROTECTION CIRCUIT

TECHNICAL FIELD

The present document relates to the communication field, and in particular, to a charging protection circuit.

BACKGROUND

With the development of mobile communication technologies, mobile phones have become necessary communication tools in our daily life. When using a mobile phone, the user often feels inconvenient when using the wired charging of the mobile phone. Currently, in the relevant art, many wireless mobile phone charging solutions have been proposed. Among these wireless mobile phone charging solutions, 13.56 MHz induction charging solution has been mature relatively. This solution merely requires to place a mobile phone on an induction base of a charger and can charge the mobile phone by means of induction without plugging. This convenient and rapid charging method has been appreciated by many mobile phone manufacturers. However, the design defect of the above wireless charging solution lies in that during mass manufacture, the key part in this solution, i.e., high permeability material, is easy to fail after long-term use, which brings risks into the charging process of the mobile phone. Therefore, although the wireless charging solution is much appreciated, it also makes many manufacturers have to take into account the quality problem of the product when employing the wireless charging solution.

FIG. 1 is a schematic diagram of a wireless charging protection circuit in the relevant art. As shown in FIG. 1, the wireless charging protection circuit includes: a wireless charging base 1 and a charging receiving circuit 2. The charging receiving circuit 2 may include: a high-permeability magnetic core 20. For the consideration of receiving antenna area, a receiving antenna is usually placed directly under the battery, and the antenna plane covers the battery. In order to prevent the influence on the battery from the alternating magnetic field generated during wireless charging and at the same time increase the magnetic flux of the receiving antenna coils, a layer of high-permeability ferrite is usually added between the battery and the receiving antenna coils. This layer of ferrite material is very important for the entire wireless charger. In fact, wireless charging technology generates an alternating magnetic field using a charging base, which magnetic field is coupled to the receiving coils at the back surface of the mobile phone by means of the coil antenna on the base, like an active power transmission transformer, and the high-permeability material is equivalent to a ferrite magnetic core of the transformer. With this high-permeability material, the magnetic flux of the receiving coils can be increased, thus improving the charging efficiency. In addition, if there is no high-permeability material layer, the alternating magnetic field will directly act on the surface of the battery of the mobile phone by transmitting through the receiving antenna. The surface layer of the battery is a metal layer, the metal layer will generate eddy current effects in the alternating magnetic field, that is, an eddy current is generated on the metal surface layer to generate an opposite magnetic field, which thus reduces the magnetic flux of the coils and severely affects the charging efficiency. Moreover, when the eddy current generated on the metal surface layer of the battery by the alternating magnetic field is big enough, it will bring hazards to the safety of the battery. In addition, the wiring on the main board of the mobile phone on the back of the battery will also be affected by the alternating magnetic field, for example, electromagnetic compatibility (EMC in short) problem will be very significant. Therefore, using a high-permeability magnetic core in the wireless charging solution of the mobile phone is a necessary option.

However, the problems existing in the relevant art lie in that when this layer of ferrite material has failed or itself has some quality problem during production, it will significantly reduce the charging efficiency of the charging protection circuit, and even may cause the battery of the mobile phone to explode. Although there is very small possibility for such an incident to occur, once it happens, it will damage the brand appearance of the product, and cause the mobile phone user to contradict when purchasing and using this product. Therefore, when using a wireless charger, how to avoid the severe consequence resulted from the continuous charging of the wireless charger when the high-permeability magnetic core has failed is an urgent problem to be solved.

SUMMARY

The embodiments of the present document provide a charging protection circuit, so as to solve the problem in the relevant art that whether the high-permeability magnetic core has failed cannot be detected.

According to an embodiment of the present document, a charging protection circuit is proposed.

The charging protection circuit according to the embodiment of the present document includes a wireless charging base and a charging receiving circuit, the charging receiving circuit including: first receiving coils which are configured to receive electromagnetic waves from the wireless charging base; a high-permeability magnetic core which is coupled to the first receiving coils and is configured to block electromagnetic waves opposite to the electromagnetic waves from the wireless charging base; a detection circuit which is coupled to the high-permeability magnetic core and is configured to detect whether the high-permeability magnetic core has failed; and a power supply circuit which is coupled to the high-permeability magnetic core and is configured to convert electromagnetic energy generated by the electromagnetic waves into electric energy to supply power to a power receiving device.

The detection circuit includes: second receiving coils which are configured to receive the electromagnetic waves from the wireless charging base; a converter which is coupled to the second receiving coils and configured to convert electromagnetic energy generated by the electromagnetic waves received by the second receiving coils into an induction current; a first detection sensor which is coupled to the converter and configured to detect magnitude of the induction current; and a second comparator which is coupled to the first detection sensor and configured to compare the detected induction current with a preset induction current threshold and determine that the high-permeability magnetic core has failed when the detected induction current is greater than the preset induction current threshold.

The detection circuit includes: third receiving coils which are configured to receive the electromagnetic waves from the wireless charging base; a second detection sensor which is coupled to the third receiving coils and configured to detect a coupling power of the electromagnetic waves received by the third receiving coils; and a third comparator which is coupled to the second detection sensor and configured to compare the detected coupling power with a preset power threshold and determine that the high-permeability magnetic core has failed when the detected coupling power is greater than the preset power threshold.

The charging receiving circuit further includes: a first alarm which is configured to give an alarm when the detection circuit detects that the high-permeability magnetic core has failed.

The charging receiving circuit further includes: a near field communication (NFC) communication circuit which is coupled to the detection circuit and configured to issue an NFC shutdown charging signal when the detection circuit detects that the high-permeability magnetic core has failed.

The wireless charging base includes: an amplitude wave detection circuit which is configured to detect a signal from the NFC communication circuit; an NFC demodulation circuit which is coupled to the amplitude wave detection circuit and configured to demodulate the signal detected by the amplitude wave detection circuit; and a control circuit which is coupled to the NFC demodulation circuit and configured to cut off a power supply switch when a signal obtained by the demodulation is the NFC shutdown charging signal.

The wireless charging base further includes: a second alarm which is configured to give an alarm when the signal obtained by the demodulation is the NFC shutdown charging signal.

A coupling resonant frequency of the detection circuit is a frequency of the electromagnetic waves from the wireless charging base, or a receiving frequency of the detection circuit is high-order harmonics of the frequency of the electromagnetic waves from the wireless charging base.

A coupling area of the detection circuit and the high-permeability magnetic core is the same as an area of the high-permeability magnetic core.

An LC circuit is provided between the second receiving coils or between the third receiving coils, wherein the LC circuit is configured to fine tune a resonant frequency of the detection circuit.

With the embodiment of the present document, a detection circuit is added between a high-permeability magnetic core and a power receiving device in a charging receiving circuit to compare the electromagnetic waves received when the high-permeability magnetic core operates normally and the electromagnetic waves received when the high-permeability magnetic core has failed, so as to determine whether the high-permeability magnetic core has failed. The problem in the relevant art that whether the high-permeability magnetic core has failed cannot be detected is solved, and the serious result caused by continuous charging of a wireless charger after a high-permeability magnetic core has failed is avoided.

BRIEF DESCRIPTION OF THE DRAWINGS

Drawings are used to provide for further understanding of the present document and forming a part of the present application, and the schematic embodiments of the present document and the description thereof are configured to explain the present document rather than to limit the present document. In the drawings.

DETAILED DESCRIPTION OF THE EMBODIMENTS

The present document is described below with reference to the accompanying drawings and embodiments in detail. Note that, the embodiments of the disclosure and the features of the embodiments can be combined with each other if there is no conflict.

Figure 1:
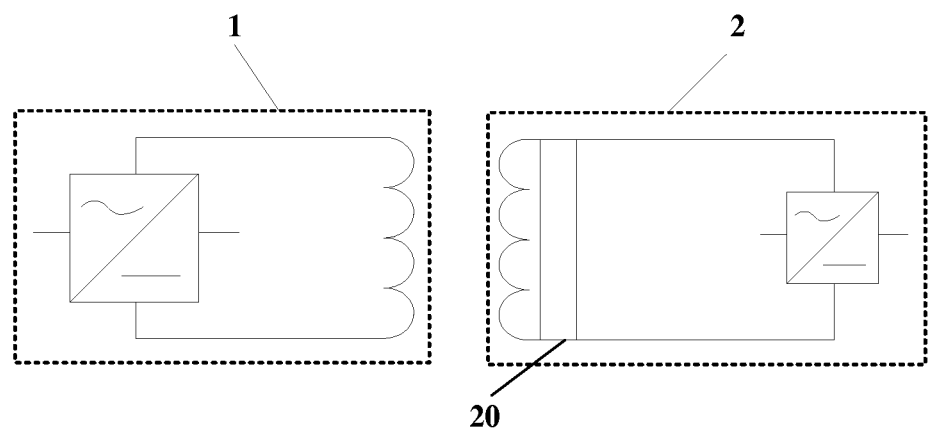
FIG. 1 is a schematic diagram of a wireless charging protection circuit in the relevant art.
Figure 2:
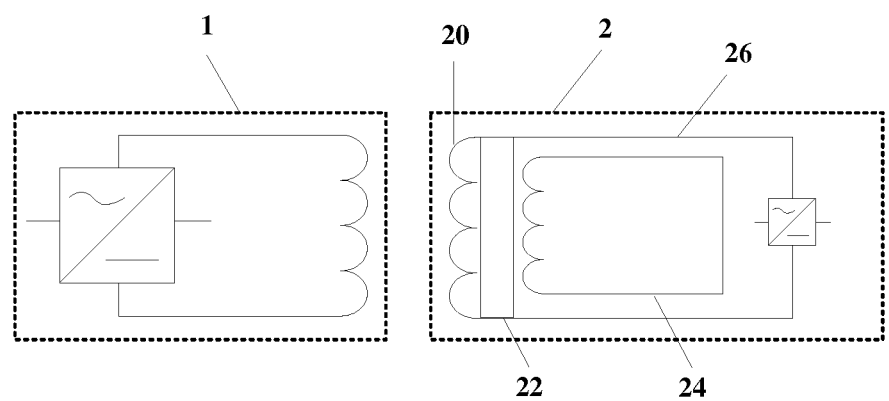
FIG. 2 is a schematic diagram of a wireless charging protection circuit according to an embodiment of the present document.

FIG. 2 is a schematic diagram of a wireless charging protection circuit according to an embodiment of the present document. As shown in FIG. 2, the charging protection circuit may include a wireless charging base 1 and a charging receiving circuit 2, wherein the charging receiving circuit 2 may include first receiving coils 20 which are configured to receive electromagnetic waves from the wireless charging base; a high-permeability magnetic core 22 which is coupled to the first receiving coils and is configured to block electromagnetic waves opposite to the electromagnetic waves from the wireless charging base; a detection circuit 24 which is coupled to the high-permeability magnetic core and is configured to detect whether the high-permeability magnetic core has failed; and a power supply circuit 26 which is coupled to the high-permeability magnetic core and is configured to convert the electromagnetic energy generated by the electromagnetic waves into electric energy to supply power to a power receiving device.

In the relevant art, whether the high-permeability magnetic core has failed cannot be detected. With the charging protection circuit shown in FIG. 2, a detection circuit is added between a high-permeability magnetic core and a power receiving device in a charging receiving circuit to compare the electromagnetic waves received when the high-permeability magnetic core operates normally and the electromagnetic waves received when the high-permeability magnetic core has failed, so as to determine whether the high-permeability magnetic core has failed. The problem in the relevant art that whether the high-permeability magnetic core has failed cannot be detected is solved, and the serious result caused by continuous charging of a wireless charger after a high-permeability magnetic core has failed is avoided.

Figure 3:
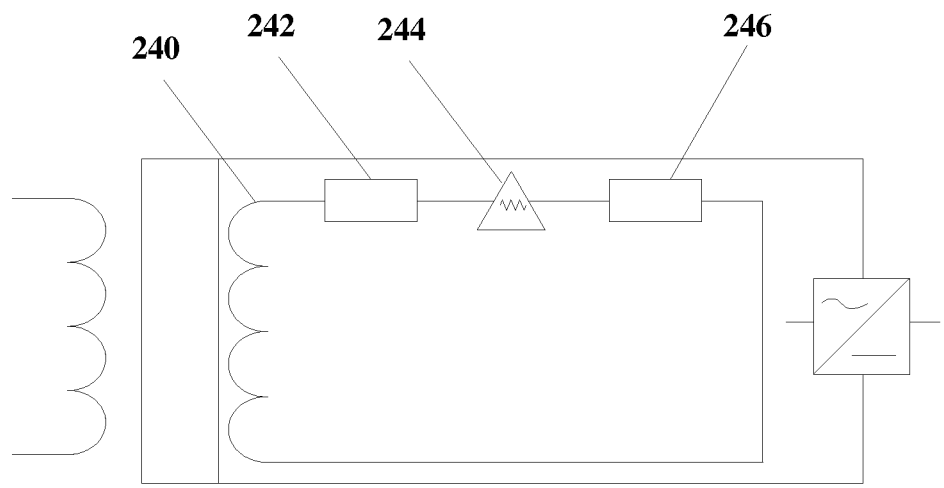
FIG. 3 is a schematic diagram of a detection circuit according to embodiment I of the present document.

In an example embodiment of the present document, as shown in FIG. 3, the detection circuit 24 may include: second receiving coils 240 which are configured to receive electromagnetic waves from the wireless charging base; a converter 242 which is coupled to the second receiving coils and configured to convert the electromagnetic energy generated by the electromagnetic waves received by the second receiving coils into an induction current; a first detection sensor 244 which is coupled to the converter and configured to detect the magnitude of the induction current; and a second comparator 246 which is coupled to the first detection sensor and configured to compare the detected induction current with a preset induction current threshold and determine that the high-permeability magnetic core has failed when the detected induction current is greater than the preset induction current threshold.

In an example embodiment, when the high-permeability magnetic core operates normally, due to the blocking of the high-permeability magnetic core, there are very few magnetic fluxes passing through the detection circuit, and the detection circuit almost cannot sense the charging alternating magnetic field, and therefore, the induction current on this detection circuit is also very small. However, when the high-permeability magnetic core has failed or itself malfunctions, the magnetic flux induced by the detection circuit will increase, and an induction current will be generated on the detection circuit. An induction current threshold is preset, and it is determined that the high-permeability magnetic core has failed when the detected induction current is greater than the set threshold.

In an example embodiment, a load resistor can be added on the first detection sensor. At this moment, the leaked alternating magnetic field will generate an induction current in the closed circuit, and the digital information of the induction current is read by the first detection sensor.

Figure 4:
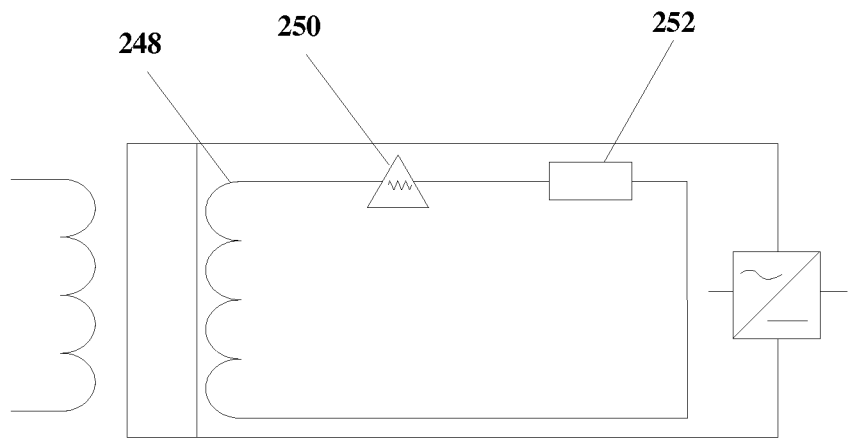
FIG. 4 is a schematic diagram of a detection circuit according to embodiment II of the present document.

In an example embodiment of the present document, as shown in FIG. 4, the detection circuit 24 may include: third receiving coils 248 which are configured to receive electromagnetic waves from the wireless charging base; a second detection sensor 250 which is coupled to the third receiving coils and configured to detect a coupling power of the electromagnetic waves received by the third receiving coils; a second detection sensor 252 which is coupled to the third receiving coils and configured to detect a coupling power of the electromagnetic waves received by the third receiving coils; a third comparator which is coupled to the second detection sensor and configured to compare the detected coupling power with a preset power threshold and determine that the high-permeability magnetic core has failed when the detected coupling power is greater than the preset power threshold.

In an example embodiment, when the high-permeability magnetic core operates normally, due to the blocking of the high-permeability magnetic core, there are very few magnetic fluxes passing through the detection circuit, and therefore, the coupling power of the electromagnetic waves on this detection circuit will be very small. However, when the high-permeability magnetic core has failed or itself malfunctions, the magnetic flux induced by the detection circuit will increase, and the coupling power of the electromagnetic waves on this detection circuit will increase. A detection amplitude threshold is preset, and it is determined that the high-permeability magnetic core has failed when the detected coupling power is greater than the set threshold.

Figure 5:
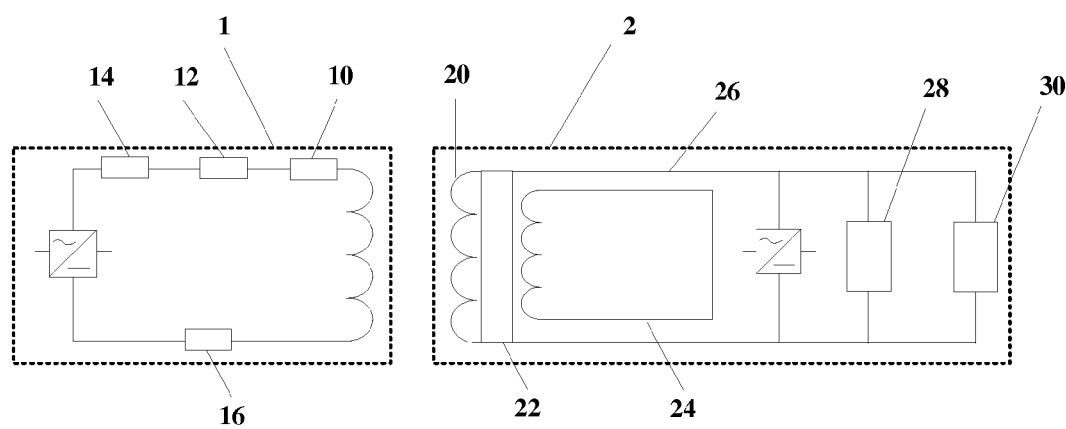
FIG. 5 is a schematic diagram of a charging protection circuit according to an example embodiment of the present document.

During implementation, as shown in FIG. 5, the charging receiving circuit 2 may further include: a first alarm 28 which is configured to give an alarm when the detection circuit detects that the high-permeability magnetic core has failed.

In an example embodiment, the mobile phone will give an alarm and notify the charging base to stop discharging, so as to avoid the severe consequence caused by the continuous charging of the wireless charger when the high-permeability magnetic core has failed.

In an example embodiment of the present document, as shown in FIG. 5, the charging receiving circuit 2 may further include: a near field communication (NFC in short) communication circuit 30 which is coupled to the detection circuit and configured to issue an NFC shutdown charging signal when the detection circuit detects that the high-permeability magnetic core has failed.

The NFC is a basic function for many mobile terminals currently. In an example embodiment, since the frequency of NFC communication is the same as the frequency of wireless charging, many manufacturers currently make a design whereby wireless charging and NFC share the same antenna, and the NFC near field communication function is used to send protection shutdown information to the charging base so as to shut down the charging circuit to stop charging.

In an example embodiment of the present document, as shown in FIG. 5, the wireless charging base 1 may include: an amplitude wave detection circuit 10 which is configured to detect the signal from the NFC communication circuit; an NFC demodulation circuit 12 which is coupled to the amplitude wave detection circuit and configured to demodulate the signal detected by the amplitude wave detection circuit; a control circuit 14 which is coupled to the NFC demodulation circuit and configured to cut off the power supply switch when a signal obtained by the demodulation is the NFC shutdown charging signal.

In an example embodiment, the characteristics that the coupling frequency of the NFC of the mobile phone and the frequency of wireless charging are the same are utilized. The NFC communication circuit of the mobile terminal gives an instruction to stop charging, and the base of the mobile phone receives an NFC signal to execute a process of shutting down charging. However, since the frequency of wireless charging is the same as the communication frequency of NFC, effective NFC signals will be immersed in the signals of wireless charging. Therefore, the amplitude modulation function of the NFC communication circuit may be needed, information is transmitted via the amplitude carriers of the signals, that is, by way of adding a bigger energy reservation and load circuit on the conventional NFC communication circuit, the signal amplitude of wireless charging can be modulated. At the same time, an amplitude wave detection circuit is added on the charging base to read the rising edges and falling edges of amplitude variations and identify the shutdown information transmitted from the mobile terminal, thereby achieving the purpose of shutdown control.

In an example embodiment of the present document, as shown in FIG. 5, the wireless charging base 1 may further include: a second alarm 16 which is configured to give an alarm when a signal obtained by the demodulation is the NFC shutdown charging signal.

During specific implementation, the coupling resonant frequency of the detection circuit is the frequency of the electromagnetic waves from the wireless charging base or the receiving frequency of the detection circuit is the high-order harmonics of the frequency of the electromagnetic waves from the wireless charging base. As such, it can be ensured that the detection circuit sensitively detects the alternating magnetic field leaked due to the high-permeability magnetic core being failed.

During specific implementation, the coupling area of the detection circuit and the high-permeability magnetic core is the same as the area of the high-permeability magnetic core. As such, the detection circuit will not miss the magnetic leakage resulted from local failure of the high-permeability magnetic core. Of course, the coupling area of the detection circuit and the high-permeability magnetic core can also be greater than the area of the high-permeability magnetic core, as long as magnetic leaking phenomena can be prevented during the detection process of the detection circuit.

During specific implementation, an LC circuit is provided between the second receiving coils or between the third receiving coils, wherein the LC circuit is configured to fine tune the resonant frequency of the detection circuit. The main frequency of the detection circuit is decided by the number of turns of the coils and the coil spacing, and the antenna uses flexible printed circuit (FPC) microstrip line process.

It can be seen from the above description that the above embodiments realize the following technical effects (it should be noted that these effects are effects that can be realized by some example embodiments): it can be realized that the detection circuit located behind the receiving charging coils during wireless charging will be triggered in the situation where the high-permeability magnetic core has failed or the performance thereof degrades, and first, the failure induction antenna adhered to the back of the high-permeability magnetic core induces the leaked charging magnetic field, and then an induction current is generated or the coupling power of the electromagnetic waves received by the detection circuit changes. When the induction current or the coupling power exceeds the preset threshold, the power receiving device will give an alarm, and transmit the alarm information to the wireless charging base via the NFC communication circuit. After receiving the alarm information, the wireless charging base rapidly cuts off charging and gives an alarm to notify the user to prevent the safety hazard caused by continuous charging and protect the safety of the power receiving device.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the present document is not restricted to any particular hardware and software combination.

The descriptions above are only the preferable embodiment of the present document, which are not used to restrict the present document, for those skilled in the art, the present document may have various changes and variations. Any amendments, equivalent substitutions, improvements, etc. within the principle of the present document are all included in the scope of the protection as defined in the appended claims of the present document.

What is claimed is:

1. A charging protection circuit, comprising: a wireless charging base and a charging receiving circuit, the charging receiving circuit comprising:
    first receiving coils which are configured to receive electromagnetic waves from the wireless charging base;
    a high-permeability magnetic core which is coupled to the first receiving coils and is configured to block electromagnetic waves opposite to the electromagnetic waves from the wireless charging base;
    a detection circuit which is coupled to the high-permeability magnetic core and is configured to detect whether the high-permeability magnetic core has failed; and
    a power supply circuit which is coupled to the high-permeability magnetic core and is configured to convert electromagnetic energy generated by the electromagnetic waves into electric energy to supply power to a power receiving device.

2. The charging protection circuit according to claim 1, wherein the detection circuit comprises:
    second receiving coils which are configured to receive the electromagnetic waves from the wireless charging base;
    a converter which is coupled to the second receiving coils and configured to convert electromagnetic energy generated by the electromagnetic waves received by the second receiving coils into an induction current;
    a first detection sensor which is coupled to the converter and configured to detect magnitude of the induction current; and
    a first comparator which is coupled to the first detection sensor and configured to compare the detected induction current with a preset induction current threshold and determine that the high-permeability magnetic core has failed when the detected induction current is greater than the preset induction current threshold.

3. The charging protection circuit according to claim 1, wherein the detection circuit comprises:
    third receiving coils which are configured to receive the electromagnetic waves from the wireless charging base;
    a second detection sensor which is coupled to the third receiving coils and configured to detect a coupling power of the electromagnetic waves received by the third receiving coils; and
    a second comparator which is coupled to the second detection sensor and configured to compare the detected coupling power with a preset power threshold and determine that the high-permeability magnetic core has failed when the detected coupling power is greater than the preset power threshold.

4. The charging protection circuit according to claim 1, wherein the charging receiving circuit further comprises:
    a first alarm which is configured to give an alarm when the detection circuit detects that the high-permeability magnetic core has failed.

5. The charging protection circuit according to claim 1, wherein the charging receiving circuit further comprises:
    a near field communication (NFC) communication circuit which is coupled to the detection circuit and configured to issue an NFC shutdown charging signal when the detection circuit detects that the high-permeability magnetic core has failed.

6. The charging protection circuit according to claim 5, wherein the wireless charging base comprises:
    an amplitude wave detection circuit which is configured to detect a signal from the NFC communication circuit;
    an NFC demodulation circuit which is coupled to the amplitude wave detection circuit and configured to demodulate the signal detected by the amplitude wave detection circuit; and
    a control circuit which is coupled to the NFC demodulation circuit and configured to cut off a power supply switch when a signal obtained by the demodulation is the NFC shutdown charging signal.

7. The charging protection circuit according to claim 6, wherein the wireless charging base further comprises:
    a second alarm which is configured to give an alarm when the signal obtained by the demodulation is the NFC shutdown charging signal.

8. The charging protection circuit according to claim 1, wherein a coupling resonant frequency of the detection circuit is a frequency of the electromagnetic waves from the wireless charging base, or a receiving frequency of the detection circuit is high-order harmonics of the frequency of the electromagnetic waves from the wireless charging base.

9. The charging protection circuit according to claim 1, wherein a coupling area of the detection circuit and the high-permeability magnetic core is the same as an area of the high-permeability magnetic core.

10. The charging protection circuit according to claim 1, wherein an LC circuit is provided between the second receiving coils or between the third receiving coils, wherein the LC circuit is configured to fine tune a resonant frequency of the detection circuit.

11. The charging protection circuit according to claim 2, wherein the charging receiving circuit further comprises:
    a first alarm which is configured to give an alarm when the detection circuit detects that the high-permeability magnetic core has failed.

12. The charging protection circuit according to claim 3, wherein the charging receiving circuit further comprises:
- a first alarm which is configured to give an alarm when the detection circuit detects that the high-permeability magnetic core has failed.

13. The charging protection circuit according to claim 2, wherein the charging receiving circuit further comprises:
- a near field communication (NFC) communication circuit which is coupled to the detection circuit and configured to issue an NFC shutdown charging signal when the detection circuit detects that the high-permeability magnetic core has failed.

14. The charging protection circuit according to claim 3, wherein the charging receiving circuit further comprises:
- a near field communication (NFC) communication circuit which is coupled to the detection circuit and configured to issue an NFC shutdown charging signal when the detection circuit detects that the high-permeability magnetic core has failed.

15. The charging protection circuit according to claim 13, wherein the wireless charging base comprises:
- an amplitude wave detection circuit which is configured to detect a signal from the NFC communication circuit;
- an NFC demodulation circuit which is coupled to the amplitude wave detection circuit and configured to demodulate the signal detected by the amplitude wave detection circuit; and
- a control circuit which is coupled to the NFC demodulation circuit and configured to cut off a power supply switch when a signal obtained by the demodulation is the NFC shutdown charging signal.

16. The charging protection circuit according to claim 14, wherein the wireless charging base comprises:
- an amplitude wave detection circuit which is configured to detect a signal from the NFC communication circuit;
- an NFC demodulation circuit which is coupled to the amplitude wave detection circuit and configured to demodulate the signal detected by the amplitude wave detection circuit; and
- a control circuit which is coupled to the NFC demodulation circuit and configured to cut off a power supply switch when a signal obtained by the demodulation is the NFC shutdown charging signal.

17. The charging protection circuit according to claim 15, wherein the wireless charging base further comprises:
- a second alarm which is configured to give an alarm when the signal obtained by the demodulation is the NFC shutdown charging signal.

18. The charging protection circuit according to claim 16, wherein the wireless charging base further comprises:
- a second alarm which is configured to give an alarm when the signal obtained by the demodulation is the NFC shutdown charging signal.

19. The charging protection circuit according to claim 2, wherein a coupling resonant frequency of the detection circuit is a frequency of the electromagnetic waves from the wireless charging base, or a receiving frequency of the detection circuit is high-order harmonics of the frequency of the electromagnetic waves from the wireless charging base.

20. The charging protection circuit according to claim 3, wherein a coupling resonant frequency of the detection circuit is a frequency of the electromagnetic waves from the wireless charging base, or a receiving frequency of the detection circuit is high-order harmonics of the frequency of the electromagnetic waves from the wireless charging base.

* * * * *